US009983937B1

(12) United States Patent
Shveidel

(10) Patent No.: US 9,983,937 B1
(45) Date of Patent: May 29, 2018

(54) SMOOTH RESTART OF STORAGE CLUSTERS IN A STORAGE SYSTEM

(71) Applicant: EMC Corporation, Hopkinton, MA (US)

(72) Inventor: Vladimir Shveidel, Pardes-Hana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 176 days.

(21) Appl. No.: 15/196,427

(22) Filed: Jun. 29, 2016

(51) Int. Cl.
G06F 11/14 (2006.01)
G06F 3/06 (2006.01)

(52) U.S. Cl.
CPC .......... *G06F 11/1438* (2013.01); *G06F 3/067* (2013.01); *G06F 3/0619* (2013.01); *G06F 3/0632* (2013.01); *G06F 3/0659* (2013.01); *G06F 11/1471* (2013.01); *G06F 2201/805* (2013.01); *G06F 2201/85* (2013.01)

(58) Field of Classification Search
CPC .... G06F 3/0619; G06F 3/0632; G06F 3/0659; G06F 11/0727; G06F 11/0751; G06F 11/1438; G06F 11/1471; G06F 2201/805; G06F 2201/85
See application file for complete search history.

(56) References Cited

U.S. PATENT DOCUMENTS

| 4,164,763 A | 8/1979 | Briccetti et al. |
| 4,608,839 A | 9/1986 | Tibbals, Jr. |
| 4,821,178 A | 4/1989 | Levin et al. |
| 5,319,645 A | 6/1994 | Bassi et al. |
| 5,537,534 A | 7/1996 | Volgt et al. |
| 5,539,907 A | 7/1996 | Srivastava et al. |
| 5,627,995 A | 5/1997 | Miller et al. |
| 5,710,724 A | 1/1998 | Burrows |
| 5,732,273 A | 3/1998 | Srivastava et al. |
| 5,860,137 A | 1/1999 | Raz et al. |
| 5,896,538 A | 4/1999 | Blandy et al. |

(Continued)

FOREIGN PATENT DOCUMENTS

| EP | 1804157 | 7/2007 |
| WO | WO 2010/019596 | 2/2010 |
| WO | WO 2010/040078 | 4/2010 |
| WO | WO 2012/066528 | 5/2012 |

OTHER PUBLICATIONS

U.S. Notice of Allowance dated Jan. 26, 2018 corresponding to U.S. Appl. No. 15/085,172; 8 Pages.

(Continued)

*Primary Examiner* — Joseph R Kudirka
(74) *Attorney, Agent, or Firm* — Daly, Crowley Mofford & Durkee, LLP

(57) ABSTRACT

Described embodiments provide methods and systems for smoothly restarting a crashed storage cluster application associated with a storage cluster of a storage system. A survivor process associated with each storage cluster application is started. If a crash of at least one of the storage cluster applications is detected, the storage system performs a smooth restart of the at least one crashed storage cluster application. A smooth restart of the at least one crashed storage cluster application is performed according to a new storage cluster application that is configured to replace the crashed storage cluster application by managing open handles associated with the crashed storage cluster application.

17 Claims, 10 Drawing Sheets

(56) References Cited

U.S. PATENT DOCUMENTS

| | | | |
|---|---|---|---|
| 5,903,730 A | 5/1999 | Asai et al. | |
| 5,940,618 A | 8/1999 | Blandy et al. | |
| 5,987,250 A | 11/1999 | Subrahmanyam | |
| 5,999,842 A | 12/1999 | Harrison et al. | |
| 6,182,086 B1 * | 1/2001 | Lomet | G06F 11/1471 |
| 6,226,787 B1 | 5/2001 | Serra et al. | |
| 6,327,699 B1 | 12/2001 | Larus et al. | |
| 6,353,805 B1 | 3/2002 | Zahir et al. | |
| 6,470,478 B1 | 10/2002 | Bargh et al. | |
| 6,519,766 B1 | 2/2003 | Barritz et al. | |
| 6,643,654 B1 | 11/2003 | Patel et al. | |
| 6,654,948 B1 | 11/2003 | Konuru et al. | |
| 6,658,471 B1 | 12/2003 | Berry et al. | |
| 6,658,654 B1 | 12/2003 | Berry et al. | |
| 6,801,914 B2 * | 10/2004 | Barga | G06F 11/1438 |
| | | | 707/674 |
| 6,820,218 B1 * | 11/2004 | Barga | G06F 11/1438 |
| | | | 714/16 |
| 6,870,929 B1 | 3/2005 | Greene | |
| 7,099,797 B1 | 8/2006 | Richard | |
| 7,143,410 B1 | 11/2006 | Coffman et al. | |
| 7,251,663 B1 | 7/2007 | Smith | |
| 7,315,795 B2 | 1/2008 | Homma | |
| 7,389,497 B1 | 6/2008 | Edmark et al. | |
| 7,421,681 B2 | 9/2008 | Dewitt, Jr. et al. | |
| 7,552,125 B1 | 6/2009 | Evans | |
| 7,574,587 B2 | 8/2009 | Dewitt, Jr. et al. | |
| 7,693,999 B2 * | 4/2010 | Park | H04L 67/24 |
| | | | 380/277 |
| 7,714,747 B2 | 5/2010 | Fallon | |
| 7,814,218 B1 | 10/2010 | Knee et al. | |
| 7,827,136 B1 | 11/2010 | Wang et al. | |
| 7,908,436 B1 | 3/2011 | Srinivasan et al. | |
| 8,200,923 B1 | 6/2012 | Healey et al. | |
| 8,335,899 B1 | 12/2012 | Meiri et al. | |
| 8,478,951 B1 | 7/2013 | Healey et al. | |
| 9,037,822 B1 | 5/2015 | Meiri et al. | |
| 9,104,326 B2 | 8/2015 | Frank et al. | |
| 9,128,942 B1 | 9/2015 | Pfau et al. | |
| 9,208,162 B1 | 12/2015 | Hallak et al. | |
| 9,304,889 B1 | 4/2016 | Chen et al. | |
| 9,330,048 B1 | 5/2016 | Bhamagar et al. | |
| 9,762,460 B2 | 9/2017 | Pawlowski | |
| 9,769,254 B2 | 9/2017 | Gilbert et al. | |
| 9,785,468 B2 | 10/2017 | Mitchell et al. | |
| 2002/0056031 A1 | 5/2002 | Skiba et al. | |
| 2002/0133512 A1 | 9/2002 | Milillo et al. | |
| 2003/0023656 A1 | 1/2003 | Hutchison et al. | |
| 2003/0079041 A1 | 4/2003 | Parrella, Sr. et al. | |
| 2003/0145251 A1 | 7/2003 | Cantrill | |
| 2004/0030721 A1 | 2/2004 | Kruger et al. | |
| 2005/0039171 A1 | 2/2005 | Avakian et al. | |
| 2005/0102547 A1 | 5/2005 | Keeton et al. | |
| 2005/0125626 A1 | 6/2005 | Todd | |
| 2005/0144416 A1 | 6/2005 | Lin | |
| 2005/0171937 A1 | 8/2005 | Hughes et al. | |
| 2005/0177603 A1 | 8/2005 | Shavit | |
| 2005/0193084 A1 | 9/2005 | Todd et al. | |
| 2006/0031653 A1 | 2/2006 | Todd et al. | |
| 2006/0031787 A1 | 2/2006 | Ananth et al. | |
| 2006/0047776 A1 | 3/2006 | Cheng et al. | |
| 2006/0070076 A1 | 3/2006 | Ma | |
| 2006/0123212 A1 | 6/2006 | Yagawa | |
| 2006/0242442 A1 | 10/2006 | Armstrong et al. | |
| 2007/0078982 A1 | 4/2007 | Aidun et al. | |
| 2007/0208788 A1 | 9/2007 | Chakravarty et al. | |
| 2007/0297434 A1 | 12/2007 | Arndt et al. | |
| 2008/0098183 A1 | 4/2008 | Morishita et al. | |
| 2008/0123212 A1 | 5/2008 | Yagawa | |
| 2008/0163215 A1 | 7/2008 | Jiang et al. | |
| 2008/0178050 A1 | 7/2008 | Kern et al. | |
| 2008/0243952 A1 | 10/2008 | Webman et al. | |
| 2008/0288739 A1 | 11/2008 | Bamba et al. | |
| 2009/0006745 A1 | 1/2009 | Cavallo et al. | |
| 2009/0030986 A1 | 1/2009 | Bates | |
| 2009/0049450 A1 | 2/2009 | Dunshea et al. | |
| 2009/0055613 A1 | 2/2009 | Maki et al. | |
| 2009/0089483 A1 | 4/2009 | Tanaka et al. | |
| 2009/0100108 A1 | 4/2009 | Chen et al. | |
| 2009/0222598 A1 | 9/2009 | Flynn et al. | |
| 2009/0319996 A1 | 12/2009 | Shafi et al. | |
| 2010/0042790 A1 | 2/2010 | Mondal et al. | |
| 2010/0088296 A1 | 4/2010 | Periyagaram et al. | |
| 2010/0180145 A1 | 7/2010 | Chu | |
| 2010/0199066 A1 | 7/2010 | Artan et al. | |
| 2010/0205330 A1 | 8/2010 | Noborikawa et al. | |
| 2010/0223619 A1 | 9/2010 | Jaquet et al. | |
| 2010/0257149 A1 | 10/2010 | Cognigni et al. | |
| 2011/0060722 A1 | 3/2011 | Li et al. | |
| 2011/0078494 A1 | 3/2011 | Maki et al. | |
| 2011/0083026 A1 | 4/2011 | Mikami et al. | |
| 2011/0099342 A1 | 4/2011 | Ozdemir | |
| 2011/0119679 A1 | 5/2011 | Muppirala et al. | |
| 2011/0161297 A1 | 6/2011 | Parab | |
| 2011/0225122 A1 | 9/2011 | Denult et al. | |
| 2011/0289291 A1 | 11/2011 | Agombar et al. | |
| 2012/0054472 A1 | 3/2012 | Altman et al. | |
| 2012/0059799 A1 | 3/2012 | Oliveira et al. | |
| 2012/0078852 A1 | 3/2012 | Haselton et al. | |
| 2012/0124282 A1 | 5/2012 | Frank et al. | |
| 2012/0278793 A1 | 11/2012 | Jalan et al. | |
| 2012/0290546 A1 | 11/2012 | Smith et al. | |
| 2012/0290798 A1 | 11/2012 | Huang et al. | |
| 2012/0304024 A1 | 11/2012 | Rohleder et al. | |
| 2013/0031047 A1 | 1/2013 | Liu et al. | |
| 2013/0073527 A1 | 3/2013 | Bromley | |
| 2013/0111007 A1 | 5/2013 | Hoffmann et al. | |
| 2013/0138607 A1 | 5/2013 | Bashyam et al. | |
| 2013/0151683 A1 | 6/2013 | Jain et al. | |
| 2013/0151759 A1 | 6/2013 | Shim et al. | |
| 2013/0246354 A1 | 9/2013 | Clayton et al. | |
| 2013/0246724 A1 | 9/2013 | Furuya | |
| 2013/0265883 A1 | 10/2013 | Henry et al. | |
| 2013/0282997 A1 | 10/2013 | Suzuki et al. | |
| 2013/0332610 A1 | 12/2013 | Beveridge | |
| 2013/0339533 A1 * | 12/2013 | Neerincx | G06F 17/30566 |
| | | | 709/228 |
| 2014/0032964 A1 * | 1/2014 | Neerincx | G06F 17/30348 |
| | | | 714/18 |
| 2014/0040199 A1 | 2/2014 | Golab et al. | |
| 2014/0040343 A1 | 2/2014 | Nickolov et al. | |
| 2014/0136759 A1 | 5/2014 | Sprouse et al. | |
| 2014/0161348 A1 | 6/2014 | Sutherland et al. | |
| 2014/0195484 A1 | 7/2014 | Wang et al. | |
| 2014/0237201 A1 | 8/2014 | Swift | |
| 2014/0297588 A1 | 10/2014 | Babashetty et al. | |
| 2014/0359231 A1 | 12/2014 | Matthews | |
| 2014/0380282 A1 | 12/2014 | Ravindranath Sivalingam et al. | |
| 2015/0006910 A1 | 1/2015 | Shapiro | |
| 2015/0088823 A1 | 3/2015 | Chen et al. | |
| 2015/0112933 A1 | 4/2015 | Sata Pathy | |
| 2015/0149739 A1 | 5/2015 | Seo et al. | |
| 2015/0205816 A1 | 7/2015 | Periyagaram et al. | |
| 2015/0249615 A1 | 9/2015 | Chen et al. | |
| 2015/0324236 A1 | 11/2015 | Gopalan et al. | |
| 2016/0042285 A1 | 2/2016 | Gilenson et al. | |
| 2016/0062853 A1 | 3/2016 | Sugabrahmam et al. | |
| 2016/0080482 A1 | 3/2016 | Gilbert et al. | |
| 2016/0188419 A1 | 6/2016 | Dagar et al. | |
| 2016/0350391 A1 | 12/2016 | Vijayan et al. | |
| 2016/0359968 A1 | 12/2016 | Chitti et al. | |
| 2016/0366206 A1 | 12/2016 | Shemer et al. | |
| 2017/0123704 A1 | 5/2017 | Sharma et al. | |
| 2017/0139786 A1 | 5/2017 | Simon et al. | |
| 2017/0161348 A1 | 6/2017 | Araki et al. | |

OTHER PUBLICATIONS

U.S. Notice of Allowance dated Jan. 24, 2018 corresponding to U.S. Appl. No. 15/085,181; 8 Pages.

Response to U.S. Non-Final Office Action dated Nov. 1, 2017 corresponding to U.S. Appl. No. 15/196,374; Response filed Jan. 30, 2018; 14 Pages.

(56) References Cited

OTHER PUBLICATIONS

U.S. Appl. No. 14/034,981, filed Sep. 24, 2013 Halevi et al.
U.S. Appl. No. 14/037,577, filed Sep. 26, 2013, Ben-Moshe et al.
U.S. Appl. No. 14/230,405, filed Mar. 31, 2014, Meiri et al.
U.S. Appl. No. 14/230,414, filed Mar. 31, 2014, Meiri.
U.S. Appl. No. 14/317,449, filed Jun. 27, 2014, Halevi et al.
U.S. Appl. No. 14/494,895, filed Sep. 24, 2014, Meiri et al.
U.S. Appl. No. 14/494,899, filed Sep. 24, 2014, Chen et al.
U.S. Appl. No. 14/979,890, filed Dec. 28, 2015, Meiri et al.
U.S. Appl. No. 15/001,784, filed Jan. 20, 2016, Meiri et al.
U.S. Appl. No. 15/001,789, filed Jan. 20, 2016, Meiri et al.
U.S. Appl. No. 15/085,168, filed Mar. 30, 2016, Meiri et al.
U.S. Appl. No. 15/076,775, filed Mar. 22, 2016, Chen et al.
U.S. Appl. No. 15/076,946, filed Mar. 22, 2016, Meiri.
U.S. Appl. No. 15/085,172, filed Mar. 30, 2016, Meiri.
U.S. Appl. No. 15/085,181, filed Mar. 30, 2016, Meiri et al.
U.S. Appl. No. 15/085,188, filed Mar. 30, 2016, Meiri et al.
U.S. Appl. No. 15/196,674, filed Jun. 29, 2016, Kleiner, et al.
U.S. Appl. No. 15/196,374, filed Jun. 29, 2016, Shveidel, et al.
U.S. Appl. No. 15/196,447, filed Jun. 29, 2016, Shveidel, et al.
U.S. Appl. No. 15/196,472, filed Jun. 29, 2016, Shveidel.
PCT International Search Report and Written Opinion dated Dec. 1, 2011 for PCT Application No. PCT/IL2011/000692; 11 Pages.
PCT International Preliminary Report dated May 30, 2013 for PCT Patent Application No. PCT/IL2011/000692; 7 Pages.
U.S. Appl. No. 12/945,915; 200 Pages.
U.S. Appl. No. 12/945,915; 108 Pages.
U.S. Appl. No. 12/945,915; 67 Pages.
Nguyen et al., "B+ Hash Tree: Optimizing Query Execution Times for on-Disk Semantic Structures;" Proceedings of the 6$^{th}$International Workshop on Scalable Semantic Web Knowledge Base Systems; Shanghai China, Nov. 8, 2010; 16 Pages.
Notice of Allowance dated Apr. 13, 2015 corresponding to U.S. Appl. No. 14/037,511; 11 Pages.
Non-Final Office Action dated May 11, 2015 corresponding to U.S. Appl. No. 14/037,626; 13 Pages.
Response to Office Action dated May 11, 2015 corresponding to U.S. Appl. No. 14/037,626; Response filed on Jul. 20, 2015; 10 Pages.
Notice of Allowance dated Oct. 26, 2015 corresponding to U.S. Appl. No. 14/037,626; 12 Pages.
Office Action dated Jul. 22, 2015 U.S. Appl. No. 14/034,981; 28 Pages.
Response to Office Action dated Jul. 22, 2015 corresponding to U.S. Appl. No. 14/034,981; Response filed on Dec. 22, 2015; 14 Pages.
Office Action dated Sep. 1, 2015 corresponding to U.S. Appl. No. 14/230,414; 13 Pages.
Response to Office Action dated Sep. 1, 2015 corresponding to U.S. Appl. No. 14/230,414, Response filed on Jan. 14, 2016; 10 Pages.
Restriction Requirement dated Sep. 24, 2015 corresponding to U.S. Appl. No. 14/230,405; 8 Pages.
Response to Restriction Requirement dated Sep. 24, 2015 corresponding to U.S. Appl. No. 14/230,405;Response filed Oct. 6, 2015; 1 Page.
Office Action dated Dec. 1, 2015 corresponding to U.S. Appl. No. 14/230,405; 17 Pages.
Office Action dated Feb. 4, 2016 corresponding to U.S. Appl. No. 14/037,577; 26 Pages.
Notice of Allowance dated Feb. 10, 2016 corresponding to U.S. Appl. No. 19 Pages.
Notice of Allowance dated Feb. 26, 2016 corresponding to U.S. Appl. No. 14/230,414; 8 Pages.
Final Office Action dated Apr. 6, 2016 corresponding to U.S. Appl. No. 14/034,981; 38 Pages.
Response filed on May 2, 2016 to the Non-Final Office Action dated Dec. 1, 2015; for U.S. Appl. No. 14/230,405; 8 pages.
Response filed on May 2, 2016 to the Non-Final Office Action dated Feb. 4, 2016; for U.S. Appl. No. 14/037,577; 10 pages.
U.S. Non-Final Office Action dated Dec. 11, 2017 for U.S. Appl. No. 15/196,447; 54 Pages.
U.S. Non-Final Office Action dated Dec. 14, 2017 for U.S. Appl. No. 15/076,946; 28 Pages.
U.S. Non-Final Office Action dated Jan. 11, 2018 corresponding to U.S. Appl. No. 15/085,168; 14 Pages.
U.S. Non-Final Office Action dated Dec. 29, 2017 corresponding to U.S. Appl. No. 15/196,674; 34 Pages.
U.S. Non-Final Office Action dated Jan. 8, 2018 corresponding to U.S. Appl. No. 15/196,472; 16 Pages.

\* cited by examiner

US 9,983,937 B1

SMOOTH RESTART OF STORAGE CLUSTERS IN A STORAGE SYSTEM

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One aspect may provide a method for smoothly restarting a crashed storage cluster application associated with a storage cluster of a storage system. A survivor process associated with each storage cluster application is started. If a crash of at least one of the storage cluster applications is detected, the storage system performs a smooth restart of the at least one crashed storage cluster application. A smooth restart of the at least one crashed storage cluster application is performed according to a new storage cluster application that is configured to replace the crashed storage cluster application by managing open handles associated with the crashed storage cluster application.

Another aspect may provide a system including a processor and a memory storing computer program code that when executed on the processor causes the processor to execute commands of a storage system. The system is operable to start a survivor process associated with each storage cluster application. If a crash of at least one of the storage cluster applications is detected, the storage system performs a smooth restart of the at least one crashed storage cluster application. A smooth restart of the at least one crashed storage cluster application is performed according to a new storage cluster application that is configured to replace the crashed storage cluster application by managing open handles associated with the crashed storage cluster application.

Another aspect may provide a computer program product including a non-transitory computer readable storage medium having computer program code encoded thereon that when executed on a processor of a computer causes the computer to execute commands of a storage system. The system is operable to start a survivor process associated with each storage cluster application. If a crash of at least one of the storage cluster applications is detected, the storage system performs a smooth restart of the at least one crashed storage cluster application. A smooth restart of the at least one crashed storage cluster application is performed according to a new storage cluster application that is configured to replace the crashed storage cluster application by managing open handles associated with the crashed storage cluster application.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1:
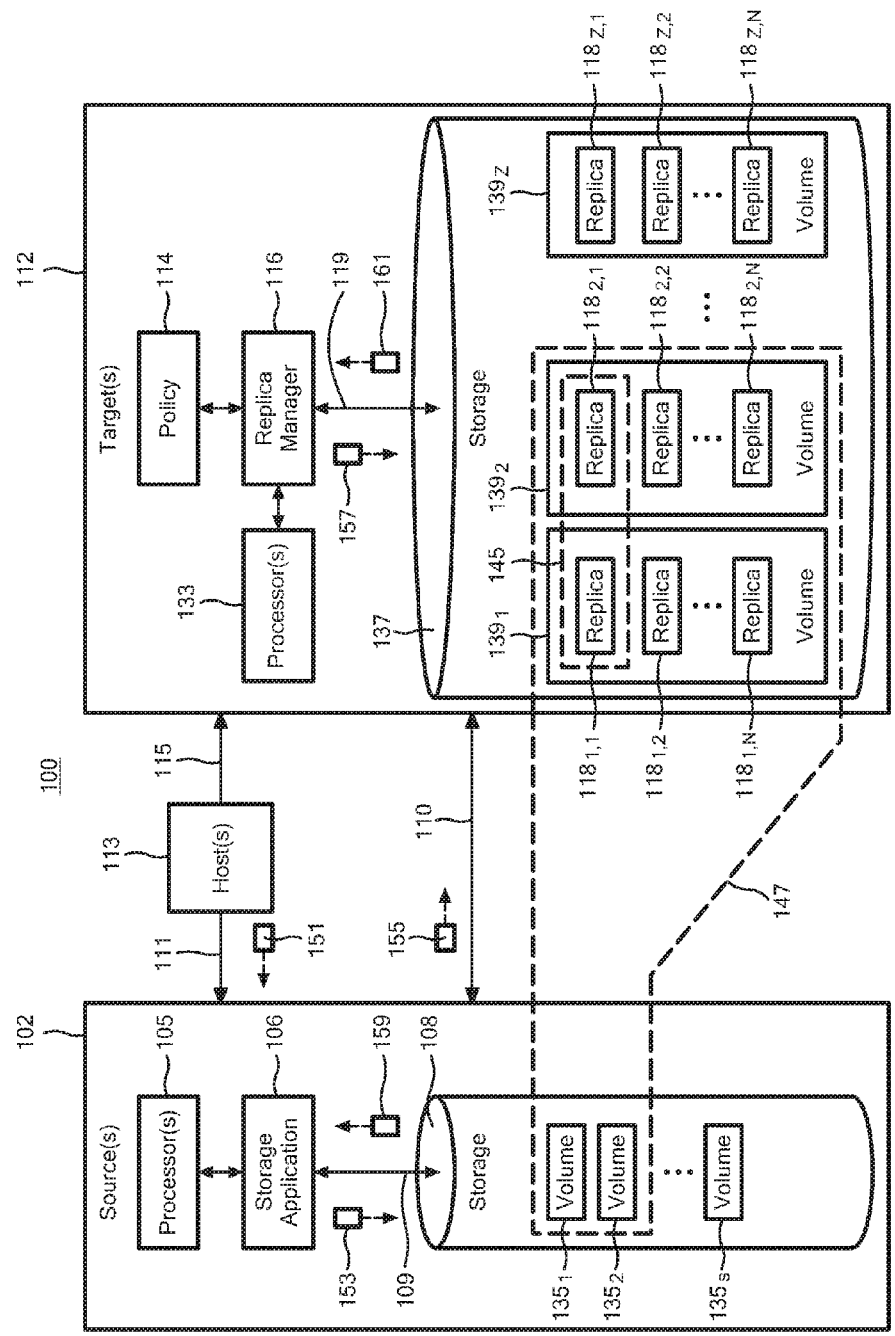
FIG. 1 is a block diagram of an example of a storage system in accordance with an illustrative embodiment.

FIG. 1 shows an example storage system 100 that may perform reactive flow control with a dynamic window to provide guaranteed maximum latency for input/output (I/O) operations of storage system 100, in accordance with illustrative embodiments.

Storage system 100 may include at least one source site 102 and at least one target site 112, which may be co-located or geographically separated. Source site 102 may include one or more processors 105, storage application 106, and storage 108. In some embodiments, storage 108 may include one or more storage volumes $135_{1-S}$, that operate as active or production volumes. Source site 102 and target site 112 may be in communication with one or more hosts 113 via communication links 111 and 115, respectively.

Hosts 113 may perform input/output (I/O) operations on source-side storage 108 (e.g., read data from and write data to storage 108). In some embodiments, the I/O operations may be intercepted by and controlled by storage application 106. As changes are made to data stored on storage 108 via the I/O operations from hosts 113, or over time as storage system 100 operates, storage application 106 may perform operations to replicate data from source site 102 to target site 112 over communication link 110. In some embodiments, communication link 110 may be a long distance communication link of a storage area network (SAN), such as an Ethernet or Internet (e.g., TCP/IP) link that may employ, for example, the iSCSI protocol. In some embodiments, one or both of source site 102 and/or target site 112 may include one or more internal (e.g., short distance) communication links (shown as communication links 109 and 119), such as an InfiniBand (IB) link or Fibre Channel (FC) link. Communication link 109 may be employed to transfer data between storage volumes $135_{1-S}$ of storage 108 and one or both of storage application 106 and processor(s) 105. Communication link 119 may be employed to transfer data between storage volumes $139_{1-Z}$ of storage 137 and one or both of replica manager 116 and processor(s) 133.

In illustrative embodiments, target site 112 may include replica manager 116 that manages a plurality of replicas $118_{1-N}$ according to a policy 114 (e.g., a replication and/or retention policy). Replicas 118 may be stored in one or more volumes $139_{1-Z}$ of storage 137 of target site 112. A replica (or snapshot) may be created from data within storage 108 and transferred to one or more target sites 112 during a data replication cycle that may be performed based on data replication policies (e.g., policy 114) that may define various settings for data recovery operations. A data replication cycle may be asynchronous data replication performed at time-based intervals during operation of storage system 100, or may alternatively be synchronous data replication performed when data is changed on source site 102.

In illustrative embodiments, storage system 100 may include one or more consistency groups. A consistency group 147 may include one or more volumes 135 of source site 102, each associated with a corresponding volume 139 of target site 112. Consistency group 147 may treat source volumes 135 and target volumes 139 as a single logical entity for data replication and migration. Each volume 139 may store one or more associated replicas 118 that reflect the data in the consistency group 147 at a point in time (e.g., when the replica 118 was created). For example, replicas (e.g., snapshots) 118 may be generated for each source volume 135 of consistency group 147 at the same time, and stored on associated ones of target volumes 139. As shown in FIG. 1, an illustrative consistency group 147 may include two source volumes $135_1$ and $135_2$ and two target volumes $139_1$ and $139_2$. Each of target volumes $139_1$ and $139_2$ may include one or more replicas 118. In some embodiments, replicas 118 for respective source volumes 135 of consistency group 147 may be grouped into sets (e.g., a snapshot set or snapset 145).

Figure 2:
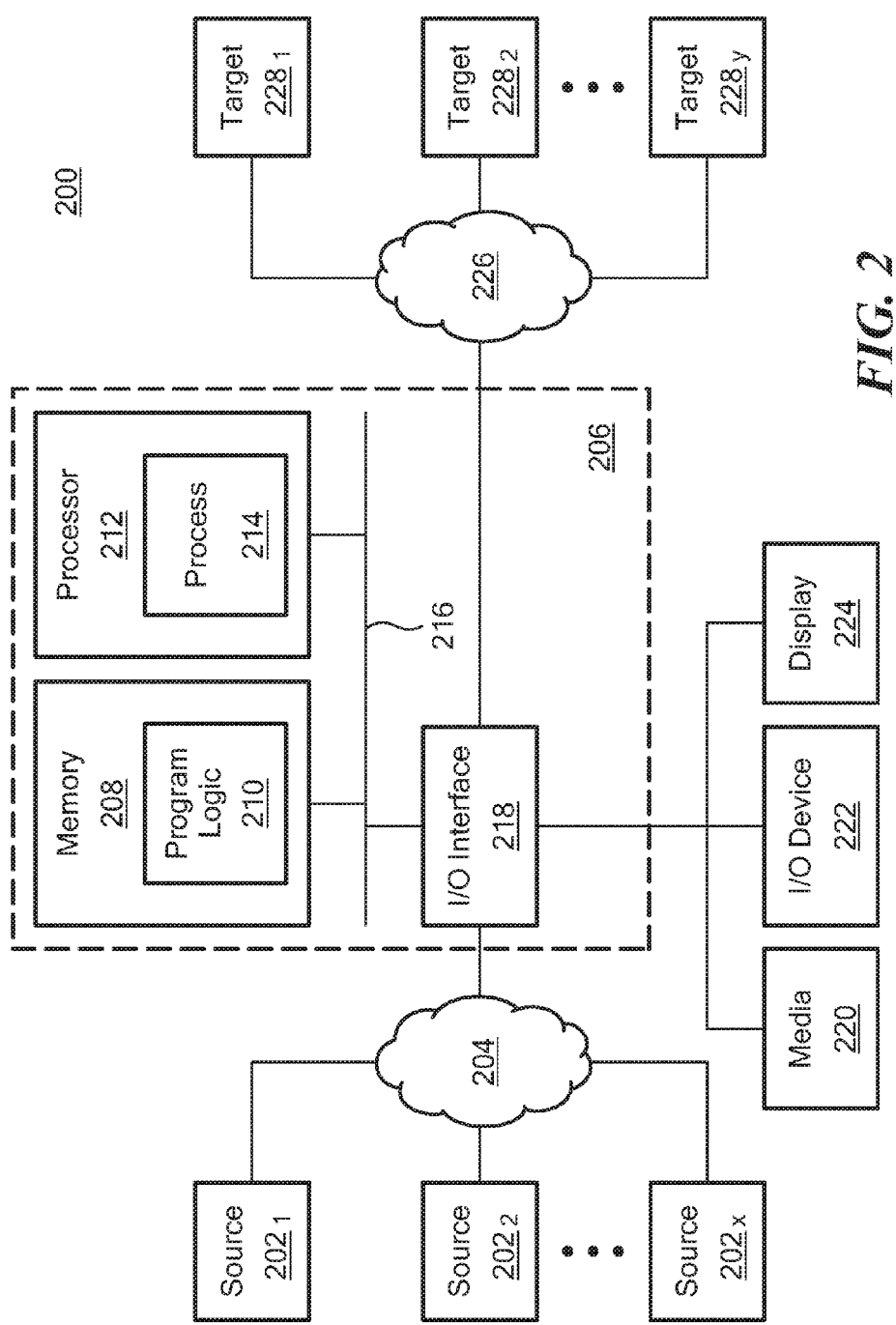
FIG. 2 is a block diagram of another example of a storage system in accordance with an illustrative embodiment.

Referring to FIG. 2, in an illustrative embodiment, apparatus 206 may form part of system 200 and include memory 208 storing program logic 210, processor 212 for executing process 214, and communications I/O interface 218, connected via a bus 216 to allow communication between memory 208, processor 212 and devices external to apparatus 206. For example, in some embodiments, communications I/O interface 218 may be coupled to apparatus 206, external media 220, one or more I/O devices 222, and a display device 224. In some embodiments, communications I/O interface 218 may couple apparatus 206 to one or more source devices $202_1$-$202_X$ via network 204. In some embodiments, communications I/O interface 218 may couple apparatus 206 to one or more target devices $228_1$-$228_Y$ via network 226. In some embodiments, network 226 of FIG. 2 may be a communication fabric between volumes of targets 228. For example, in some embodiments, network 226 may be an InfiniBand (IB) network or a Fibre Channel (FC) network.

Figure 3A:
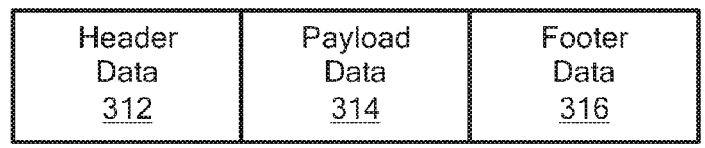
FIG. 3A is a block diagram of an example data packet of an input/output (I/O) operation of the storage system of FIG. 1 in accordance with an illustrative embodiment.

Referring back to FIG. 1, in some embodiments, one of hosts 113 may send an I/O request (e.g., I/O request 151) to perform an I/O operation on storage 108 of source site 102. For example, I/O request 151 may be a request to read an associated amount of data from storage 108, or may be a request to write an associated amount of data to storage 108. In some embodiments, I/O request 151 may include one or more data packets. For example, FIG. 3A shows a block diagram of an illustrative data packet 310. As shown in FIG. 3A, in some embodiments, data packet 310 may include one or more of header data 312, payload data 314 and footer data 316. Payload data 314 may be the data to be written to storage 108 or data that is read from storage 108 (e.g., user data), and header data 312 and/or footer data 316 may be data associated with I/O request 151 that may be employed by storage system 100 to process I/O request 151 (e.g., source and/or destination address information, error correction information, data and/or packet format information, metadata, and other information).

In some embodiments, payload data 314 may be segmented into one or more payload data segments to be written to storage 108 (e.g., by one or more write operations 153) or read from storage 108 (e.g., by one or more read operations 159). For example, if payload data 314 is 256 KB, payload data 314 may be segmented into sixteen 16 KB payload data segments to be written to storage 108. When I/O request 151 is a write request, processor(s) 105 and/or storage application 106 may then perform one or more corresponding write operations (e.g., write operation 153) to write payload data associated with the one or more data packets (e.g., one or more payload data segments) of I/O request 151 to storage 108. When I/O request 151 is a read request, processor(s) 105 and/or storage application 106 may then read data from storage 108 in one or more packets (e.g., one or more read operations 159) to process I/O request 151 from storage 108.

In illustrative embodiments, source site 102 may send a replica (e.g., replica 155) to target site 112. Similarly to write request 151, replica 155 may include one or more data packets such as shown in FIG. 3A. Processor(s) 133 and/or replica manager 116 may then perform one or more corresponding write operations (e.g., write operation 157) to write payload data (e.g., one or more payload data segments) associated with the one or more data packets of replica 155 to storage 137. Similarly, replica manager 161 may read replica data from storage 137 by one or more read operations 161. In some embodiments, data packet 310 may be a data packet formatted in accordance with the TCP/IP and iSCSI protocols.

Figure 3B:
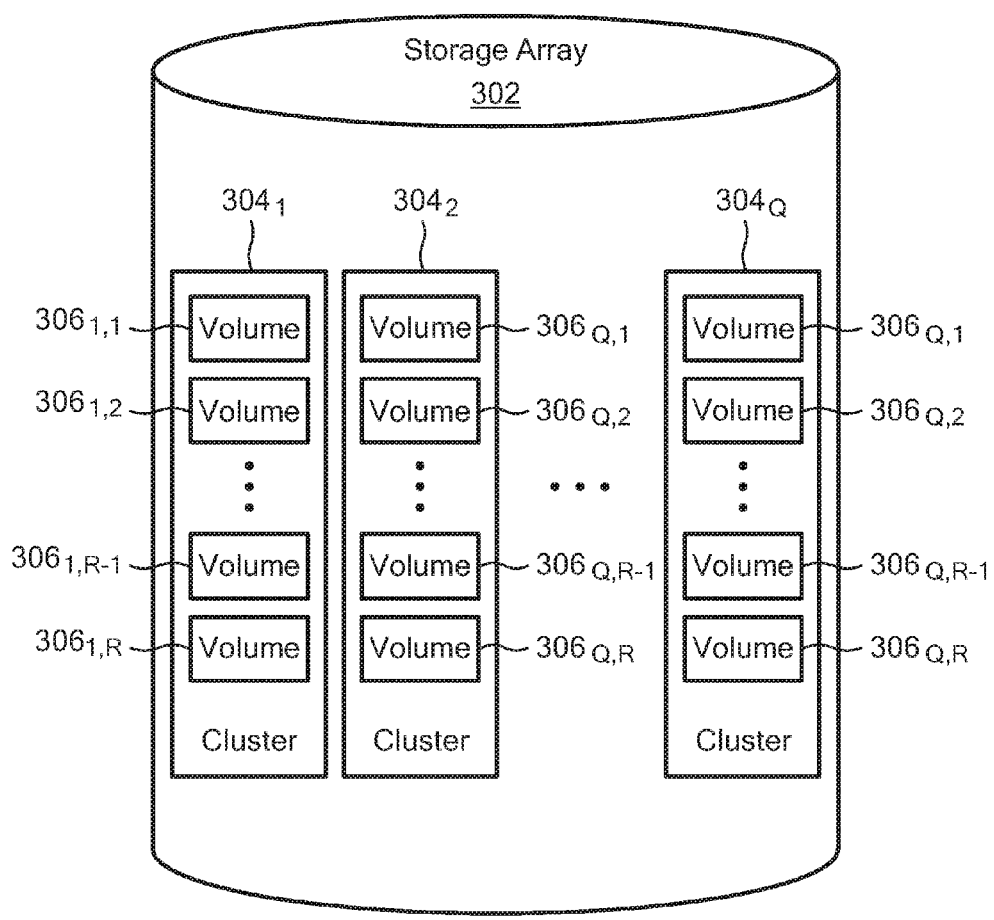
FIG. 3B is a block diagram of an example storage array of the storage system of FIG. 1 in accordance with an illustrative embodiment.

Referring to FIG. 3B, a block diagram of an illustrative storage array 302 is shown. For example, in illustrative embodiments, one or both of storage 108 and storage 137 may be implemented as storage array 302. As shown, in some embodiments, storage array 302 may include one or more clusters $304_1$-$304_Q$ (referred to generally as clusters 304) where Q may be a positive integer. In illustrative embodiments, clusters 304 may include one or more physical and/or virtual storage volumes, shown generally as storage volumes 306. For example, cluster $304_1$ may include storage volumes $306_{1,1}$-$306_{1,R}$, where R may be a positive integer. For example, clusters 304 may include one or more physical storage volumes such as hard disk drives (HDDs), solid state drives (SSDs) such as flash drives, a hybrid magnetic and solid state drive, etc., and/or one or more virtual storage volumes, such as a cloud storage, or a combination of physical storage volumes and virtual storage volumes.

Each storage cluster in a storage system may be connected to a client (e.g., one of hosts 113 of FIG. 1) by a physical interface (e.g., communications links 111 and/or 115). For example, in some embodiments, the physical interface may be a Fibre Channel (FC) link, an InfiniBand (IB) link, or an Ethernet or Internet (e.g., TCP/IP) link that may employ, for example, the iSCSI protocol.

Such physical links may be operated by corresponding drivers to allow the client to access the storage cluster. For example, illustrative embodiments may employ Unix or Linux drivers to allow the client to access a storage cluster. Thus, in some illustrative embodiments, a connection between a storage cluster and a client may be considered as an open handle between a storage cluster application and a kernel controlling the storage system. For example, a handle may be a descriptor that allows access to a resource (e.g., by specifying a network socket, file location, process, pipeline, and/or other attributes associated with the resource). For example, creation of a new volume or logical unit associated with a storage cluster (e.g., volumes 306 of storage clusters 304) may result in opening a new handle to the kernel from a corresponding application or process associated with the storage cluster.

In conventional systems, if a storage cluster application crashes (e.g., enters a fault state), the kernel may automatically close open handles associated with the crashed storage cluster. Closing a handle may result in disconnection of the client(s) from the associated storage clusters (e.g., a loss of connectivity from the client to the LUNs, volumes, and/or devices provided by a storage cluster associated with the crashed storage cluster application).

Further, in such conventional systems, closing the handles may result in loss of application context data, such as page buffers, command buffers, state information, etc. For example, since the conventional storage cluster application interacts with the physical interface using drivers, the conventional storage cluster application may send data to, and receive data from, the drivers (e.g., via an application program interface or API). This data may be buffered, and/or the driver may store some references to aspects of the conventional storage cluster application (e.g., references to process identifiers, session identifiers, etc.) as context data. In conventional systems, if a conventional storage cluster application (or process) crashes (e.g., enters a fault state), the context data may be lost. Context data may be lost when a conventional storage cluster application (or process) is restarted after a crash, since: (1) the kernel removes context data when a conventional storage cluster process is exited, and (2) the conventional storage cluster application loses in-memory context data related to the previous (crashed) process by starting a new process.

Figure 3C:
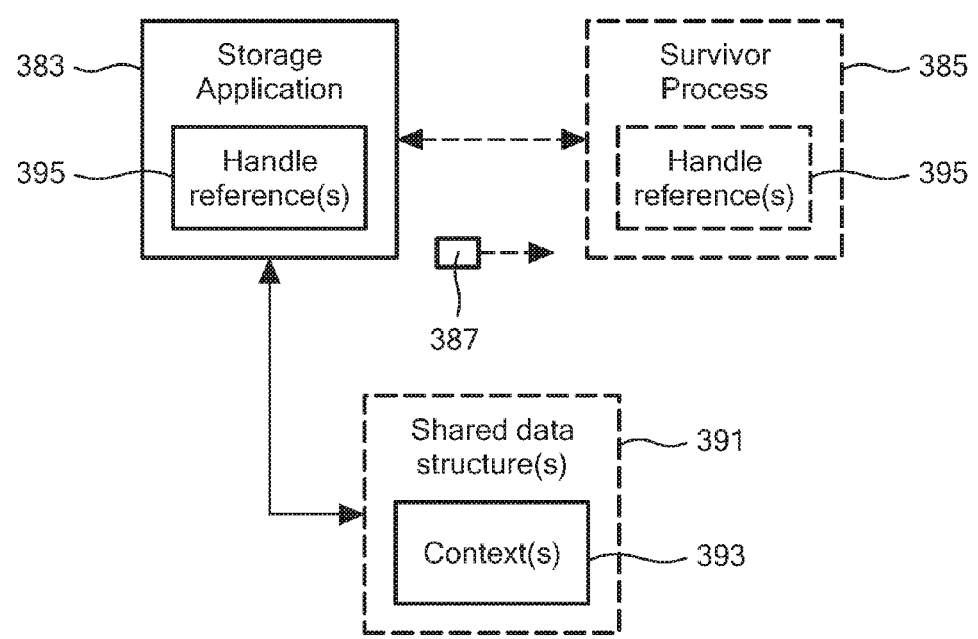
FIG. 3C is a block diagram showing a storage application and associated survivor processes and data structures in accordance with an illustrative embodiment.

Referring to FIG. 3C, described embodiments may provide smooth recovery and restart of storage clusters (e.g., storage clusters 304) after a storage cluster application (or process) 383 crashes. Some embodiments allow a storage cluster application 383 to be restarted when one or more clients (e.g., hosts 113 of FIG. 1) are physically connected to the storage cluster, without rejecting commands from the client to the storage cluster or physically disconnecting the storage cluster from the client(s). As described herein, storage application (or process) 383 may be associated with a survivor process 385, one or both of which may be in communication with one or more shared data structures 391. The shared data structures may include one or more contexts 393. Storage application (or process) 383 and survivor process 385 may each include one or more handle references 395. Data, such as handle references, may be copied between storage application 383 and survivor process 385, shown as copied data 387.

Figure 4:
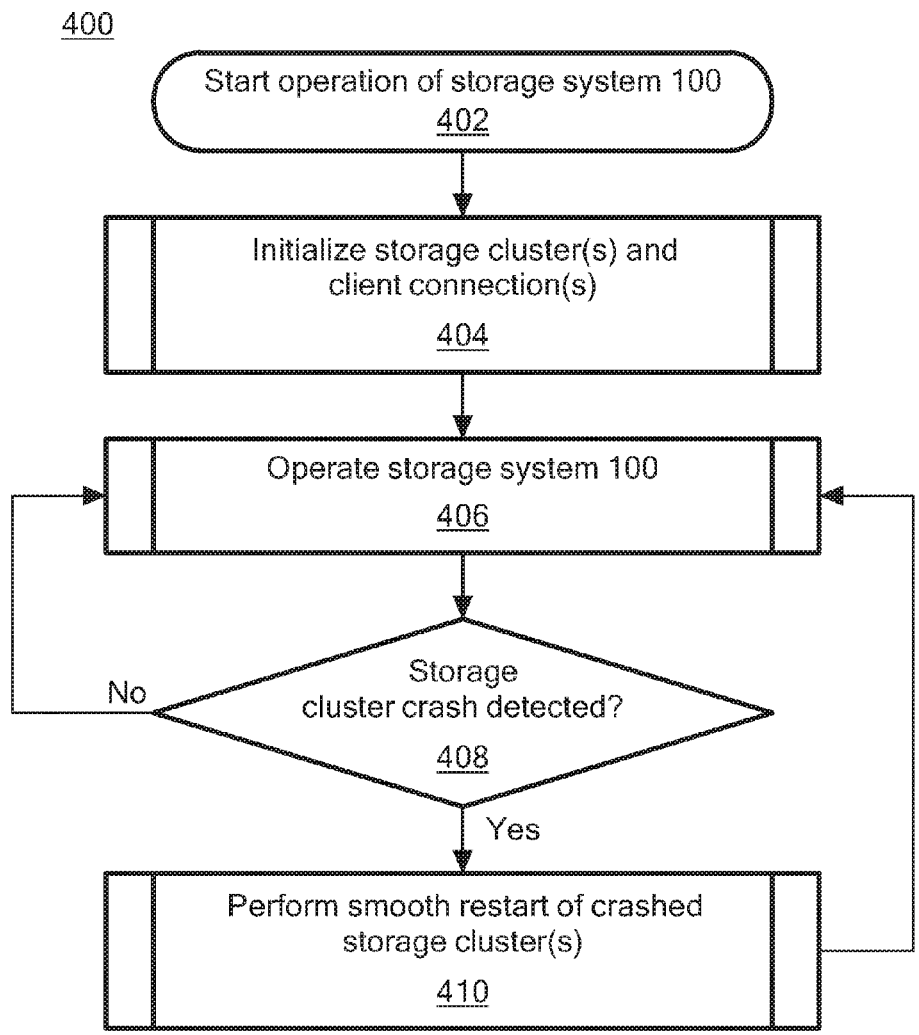
FIG. 4 is a flow diagram of an example of a process to operate the storage system of FIG. 1 in accordance with an illustrative embodiment.

FIG. 4 shows a flow diagram of an illustrative process for operating storage system 100 of FIG. 1, shown as process 400. At block 402, process 400 starts, for example when storage system 100 is powered on. At block 404, storage system 100 initializes connections between one or more storage clusters (e.g., storage clusters 304 of FIG. 3B) and one or more clients (e.g., hosts 113 of FIG. 1). Block 404 is described in greater detail in regard to FIG. 5. At block 406, storage system 100 operates, for example to process I/O requests (e.g., I/O request 151 of FIG. 1). Block 406 is described in greater detail in regard to FIG. 6.

At block 408, if, during operation of storage system 100, a crash of one or more of storage clusters 304 is detected by storage system 100, then at block 410 a smooth restart of the crashed storage cluster(s) may be performed. Block 410 is described in greater detail in regard to FIG. 8. After a crashed storage cluster is restarted, process 400 may return to block 406 to resume normal operation. If, at block 408, no storage clusters 304 have crashed, then process 400 returns to block 406 to continue operation of storage system 100. Process 400 may continue to operate until storage system 100 is powered off.

Figure 5:
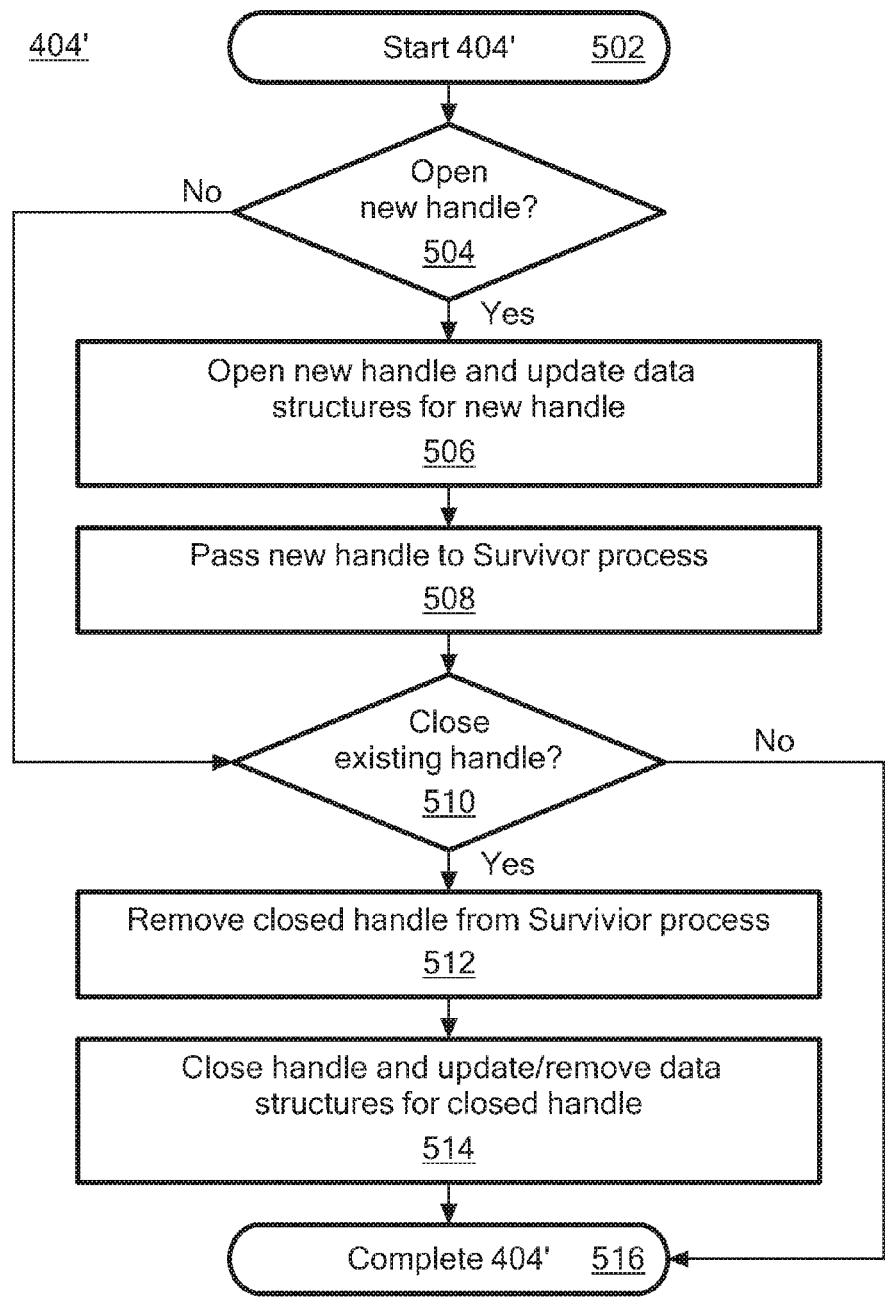
FIG. 5 is a flow diagram of an example of a process to initialize a storage cluster in accordance with an illustrative embodiment.

FIG. 5 shows additional detail of block 404 of FIG. 4, shown as process 404'. As shown in FIG. 5, storage system 100 starts initializing one or more storage clusters (e.g., storage clusters 304 of FIG. 3B) at block 502. At block 504, if a new handle (e.g., handle references 395 of FIG. 3C) is not needed, then process 404' proceeds to block 510. At block 504, if a new handle should be opened to the kernel (e.g., to create a new volume 306), then at block 506, the new handle is opened (e.g., handle references 395 of FIG. 3C) and context data (e.g., contexts 391 of FIG. 3C) associated with the storage cluster, the kernel, and the storage cluster application is updated for the new handle. Data structures associated with the context data may be stored in one or more shared memory objects (e.g., shared data structures 391 of FIG. 3C). Data structures 391 may be shared between one or more storage applications (or processes) 383 and one or more survivor processes 385. Described embodiments allow the shared memory objects to survive a crash of the storage application (or process) such that when the crashed storage application (or process) 383 is restarted, the storage application (or process) 383 first attempts to recover the context data from previously created shared memory objects 391 instead of initializing new shared memory objects. Described embodiments may initialize new shared memory objects if previously created shared memory objects do not exist or cannot be recovered.

At block 508, illustrative embodiments pass (or copy) the new handle (e.g., 387 of FIG. 3C) to a "Survivor" process (e.g., 385) associated with the storage cluster application. After block 508, process 404' proceeds to block 510.

In described embodiments, the Survivor process provides for smooth restarts of a crashed storage cluster application. As will be described, the smooth restart may make crash recovery invisible to the kernel because the storage cluster is not disconnected from ports of the client(s) when the storage cluster application restarts, and the restarted storage cluster application may restore context data of the previous (e.g., crashed) storage cluster application and continue working from the previous point in time.

In illustrative embodiments, the Survivor process (e.g., survivor process 385 of FIG. 3C) may be a Linux process of the storage cluster application. The Survivor process may act as a "backup store" of handles opened by the storage cluster application to the kernel. For example, by copying handles (e.g., copied data 387 of FIG. 3C) in a given storage cluster application (or process) to the Survivor process, both the storage cluster application (or process) 383 and the Survivor process 385 have a reference to the handles. Thus, should the storage application (or process) crash, and the storage application (or process) exits, the kernel keeps the handles (e.g., handles 395 of FIG. 3C) open, since the handles are also referenced by the Survivor process (e.g., the kernel decrements a reference count for the handles, but does not close the handle since the handle reference count is non-zero). The Survivor process may not generally perform any operations beyond maintaining a reference to copied handles and, thus, may be very reliable (e.g., not likely to crash). Some embodiments may employ a UNIX socket API to pass (or copy) handles from the storage cluster application to the Survivor process.

At block 510, if a handle is not needed (e.g., can be closed, for example when the storage application is closed for reasons other than a crash), then block 512, the handle may be removed from the Survivor process, and at block 514, the kernel closes the handle and context data (e.g., contexts 393 of FIG. 3C) associated with the storage cluster and the storage cluster application is updated to remove the closed handle. After block 514, process 404' proceeds to block 516. If, at block 510, no existing handle(s) need to be closed, process 404' proceeds to block 516. At block 516, process 404' completes.

Figure 6:
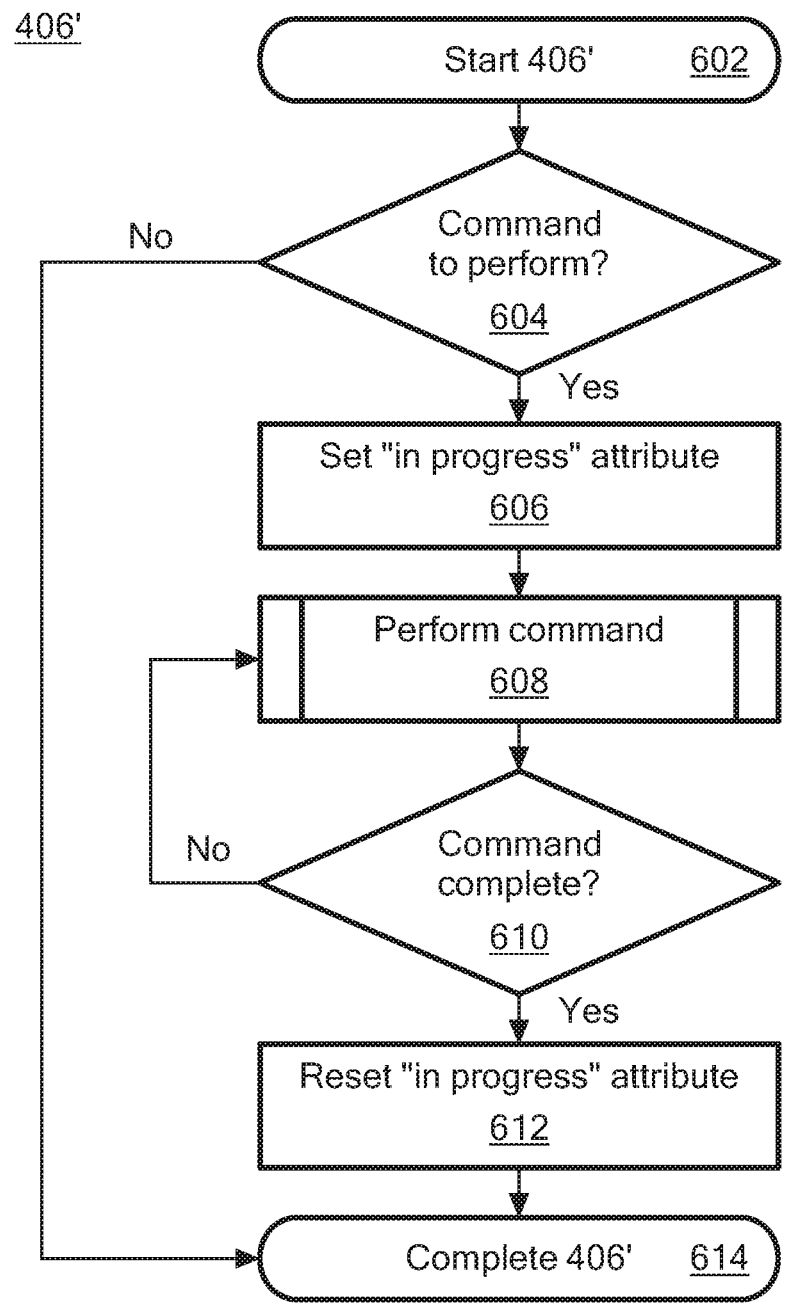
FIG. 6 is a flow diagram of an example of a process to perform commands in a storage system in accordance with an illustrative embodiment.

FIG. 6 shows additional detail of block 406 of FIG. 4, shown as process 406'. As shown in FIG. 6, process 406' may start at block 602. At block 604, if there is a command to perform (e.g., the kernel has sent a command to the storage cluster application), then at block 606, the command may be buffered, and an "in progress" attribute associated with the command may be set (e.g., indicating that the command is being performed but is not yet completed). For example, commands from the kernel, such as Small Computer System Interface (SCSI) commands, may be buffered in a shared memory object while the commands are being performed. Described embodiments maintain the command buffer shared memory object(s) if a storage cluster application (or process) crashes. Each command has an associated "in progress" attribute that is set when the command is created and that is reset when the command is completed (e.g., the storage application has replied to the kernel). Thus, in the event of a storage cluster application (or process) crash, described embodiments may recover commands that were not completed at the time of the crash. If, at block 604, there is no command to perform, process 406' completes at block 614.

At block 608, the command may be performed by the storage cluster application (or process). Block 608 is described in greater detail in regard to FIG. 7. At block 610, if the command is completed, then at block 612, the "in progress" attribute associated with the command may be reset (e.g., indicating that the command was completed). In some embodiments, the command may be removed from the command buffer shared memory object when completed. If, at block 610 the command is not completed, the storage cluster application may continue processing the command at block 608. At block 614, process 406' completes.

Figure 7:
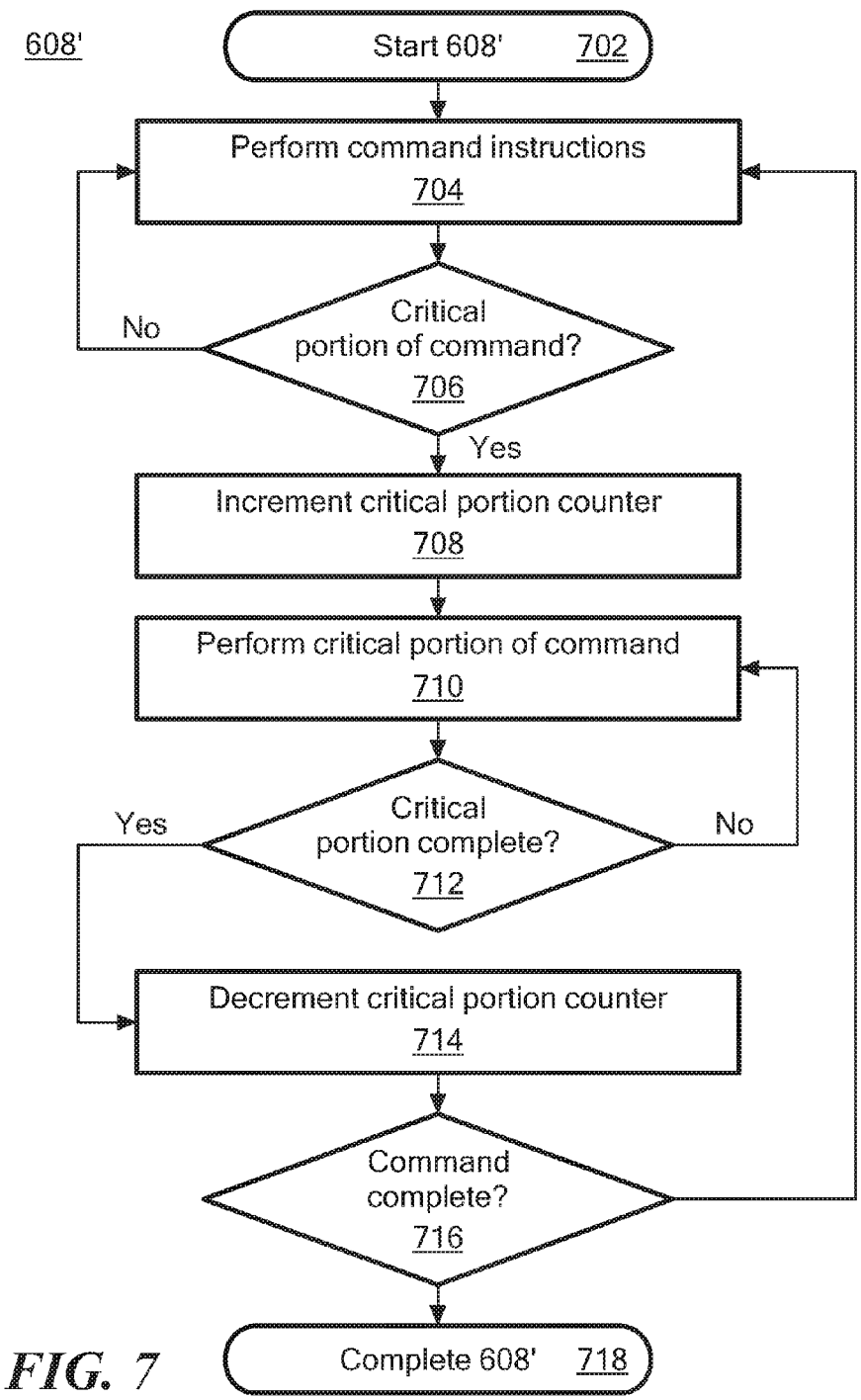
FIG. 7 is a flow diagram of an example of a process to perform commands in a storage system in accordance with an illustrative embodiment.

FIG. 7 shows additional detail of block 608 of FIG. 6, shown as process 608'. As shown in FIG. 7, process 608' may start at block 702. At block 704, one or more instructions associated with a command may be performed. At block 706, the storage application (or process) may determine whether the instructions are a "critical portion" of the command. For example, because of the unpredictability of crashes, it can be difficult to guarantee consistency of the context data related to commands that are not yet complete at the time of the crash (e.g., commands that are marked as in process at block 606). A critical portion of a command may be a portion of the command that could cause data inconsistency if a crash happened during that portion of the command.

Described embodiments identify critical portions of commands, and maintain a counter in the context data (e.g., in the shared memory objects). For example, illustrative embodiments may employ an atomic (e.g., with guaranteed isolation from other processes) inside_critical_section counter that is stored as context data in a shared memory object. Initially, the inside_critical_section counter may be zero. Each time a storage cluster application (or process) starts a sensitive flow fragment (e.g., a critical section or portion), the inside_critical_section counter may be incremented, and each time a storage cluster application (or process) exits a sensitive flow fragment (e.g., a critical section or portion), the inside_critical_section counter may be decremented. If the inside_critical_section counter is zero after a crash, the context data (e.g., the shared memory object recovered from before the crash) is consistent and can be relied upon when restarting the crashed storage cluster application (or process). If the inside_critical_section counter is not zero, the crash occurred while a critical portion was being performed, and the context data may not necessarily be consistent.

As shown in FIG. 7, at block 706, if the instructions are a "critical portion" of the command, then at block 708, the inside_critical_section counter is incremented. At block 710, the critical portion of the command is performed. At block 712, when the critical portion of the command is complete, at block 714, the inside_critical_section is decremented. At block 716, if the command is not yet complete (e.g., there are more command instructions to perform), then process 608' returns to block 704 to process additional instructions of the command. If, at block 716, the command is complete, then process 608' completes at block 718.

Figure 8:
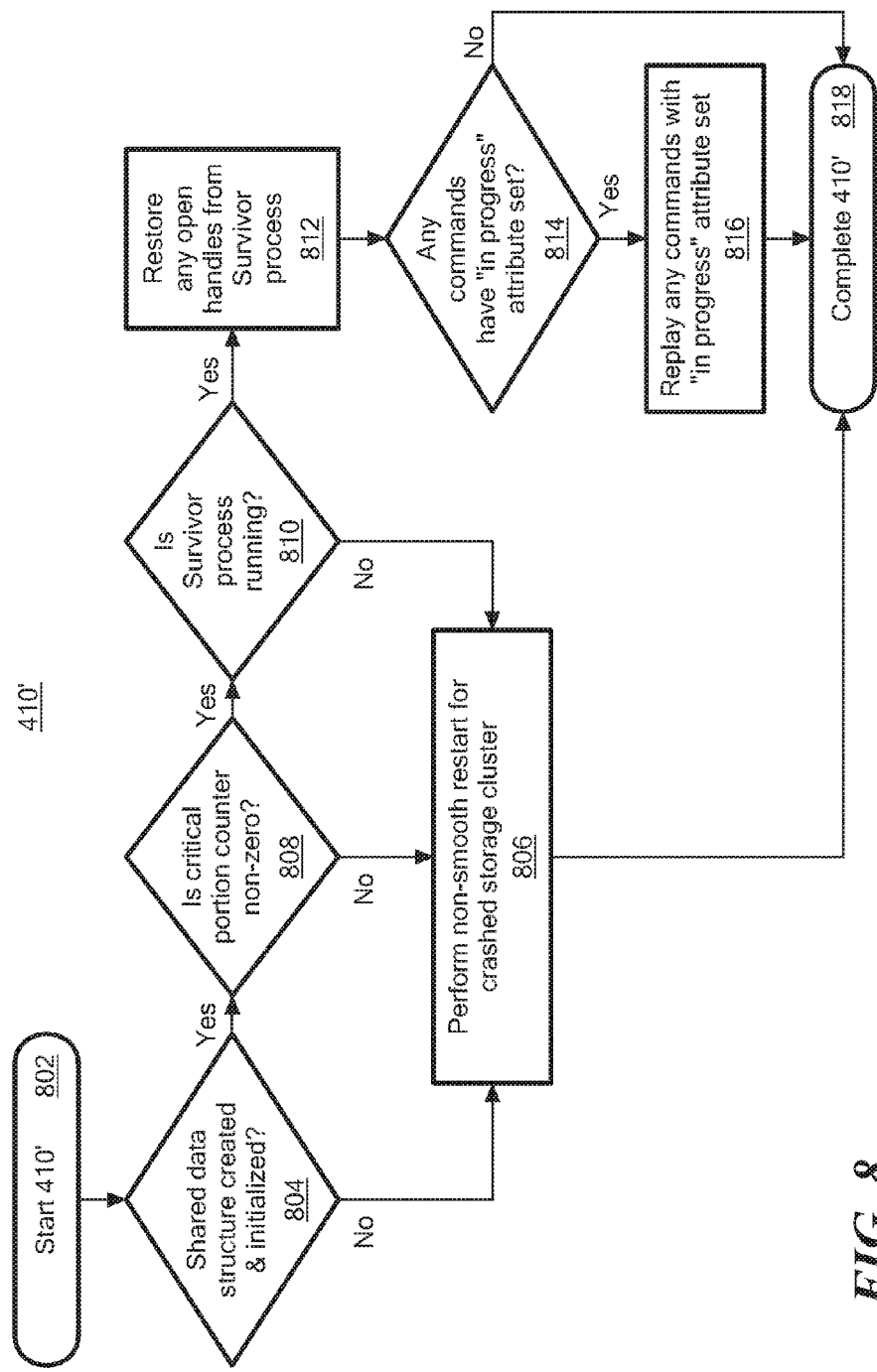
FIG. 8 is a flow diagram of an example of a process to perform a smooth restart operation for a storage cluster in accordance with an illustrative embodiment.

FIG. 8 shows additional detail of block 410 of FIG. 4, shown as process 410' for performing a smooth restart of a crashed storage cluster application (or process). As shown in FIG. 8, process 410' may start at block 802. At block 804, if the context data (e.g., the shared data structure(s)) is created and initialized, process 410' proceeds to block 808. If, at block 804, the context data is not created and initialized (e.g., does not exist or cannot be recovered after the crash), process 410' proceeds to block 806. At block 808, if the inside_critical_section counter is zero, then the context data may be consistent, and process 410' proceeds to block 810. At block 808, if the inside_critical_section counter is not zero, then the context data may be inconsistent (e.g., the crash occurred during a critical portion of a command), and process 410' proceeds to block 806. At block 810, if the Survivor process is running, process 410' proceeds to block 812. If, at block 810, the Survivor process is not running, process 410' proceeds to block 806.

At block 812, since the state of the storage application (or process) at the time of the crash was recovered (e.g., the context data was recovered, the survivor process was running which allows the handles to be recovered, and the crash did not occur during a critical portion of a command, so the context data is consistent), open handles between the kernel and the storage cluster application (or process) are restored from the Survivor process to the restarted storage cluster application (or process), and any initialization of context data associated with the restored handles is performed. At block 814, if the in progress attribute is set for any commands (e.g., if any commands were not completed at the time of the crash), then at block 816, the commands having the in progress attribute are replayed to the storage cluster application (or process) (e.g., the in progress commands are processed as if the commands were received from the kernel). Process 410' proceeds to block 818. If, at block 814, no commands had the associated in progress attribute set, process 410' proceeds to block 818.

At block 806, at least a portion of the state of the storage application (or process) before the crash could not be recovered, so the storage cluster application (or process) is restarted without a smooth restart (e.g., the client may be disconnected, the storage cluster application is restarted, and the client is reconnected). Process 410' proceeds to block 818.

At block 818, process 410' completes, and the restarted storage cluster application (or process) may operate as normal, for example by receiving new commands from the kernel (e.g., block 406 of FIG. 4).

Figure 9:
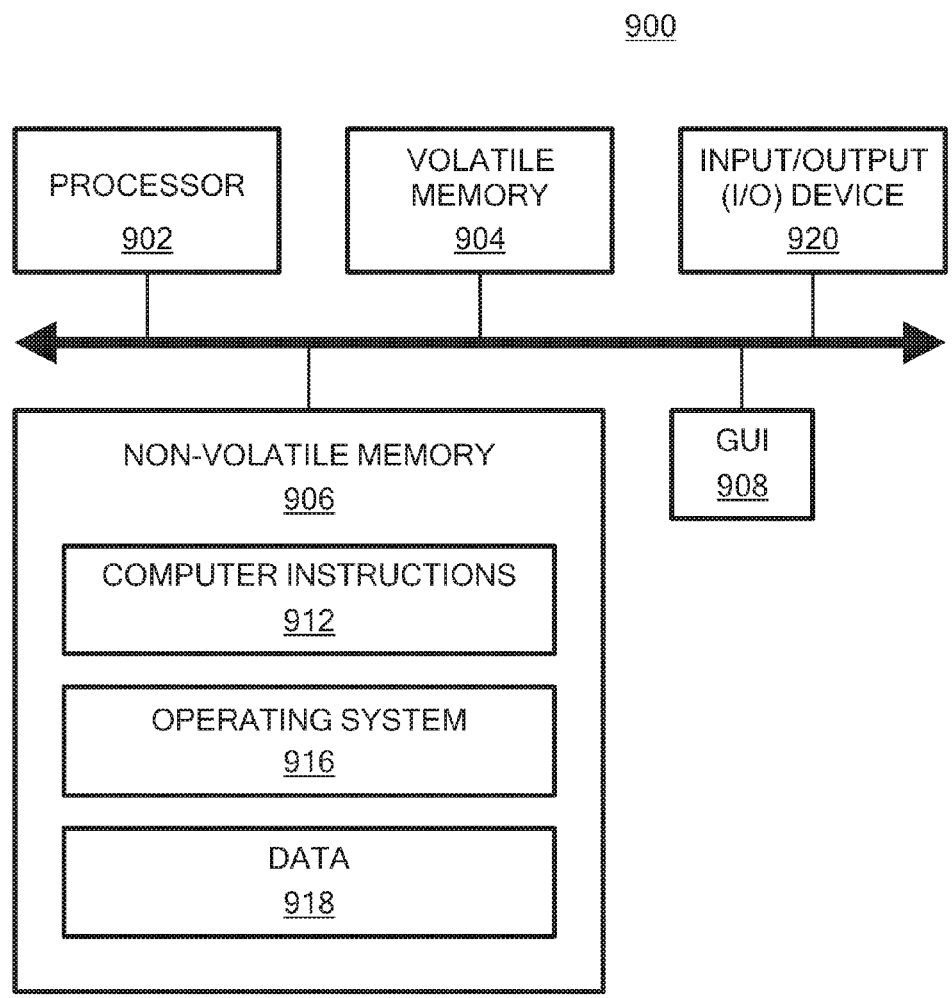
FIG. 9 is a block diagram of an example of a hardware device that may perform at least a portion of the processes in FIGS. 4-8.

Referring to FIG. 9, in some embodiments, source site 102 and/or target site 112 may be implemented as one or more computers. Computer 900 may include processor 902, volatile memory 904 (e.g., RAM), non-volatile memory 906 (e.g., a hard disk drive, a solid state drive such as a flash drive, a hybrid magnetic and solid state drive, etc.), graphical user interface (GUI) 908 (e.g., a touchscreen, a display, and so forth) and input/output (I/O) device 920 (e.g., a mouse, a keyboard, etc.). Non-volatile memory 906 stores computer instructions 912, an operating system 916 and data 918 such that, for example, the computer instructions 912 are executed by the processor 902 out of volatile memory 904 to perform at least a portion of processes 400, 404', 406', 608', and 410' (FIGS. 4-8). Program code may be applied to data entered using an input device of GUI 908 or received from I/O device 920.

Processes 400, 404', 406', 608', and 410' (FIGS. 4-8) are not limited to use with the hardware and software of FIG. 9 and may find applicability in any computing or processing environment and with any type of machine or set of machines that may be capable of running a computer program. Processes 400, 404', 406', 608', and 410' (FIGS. 4-8) may be implemented in hardware, software, or a combination of the two.

The processes described herein are not limited to the specific embodiments described. For example, processes 400, 404', 406', 608', and 410' are not limited to the specific processing order shown in FIGS. 4-8. Rather, any of the blocks of processes 400, 404', 406', 608', and 410' may be re-ordered, combined or removed, performed in parallel or in serial, as necessary, to achieve the results set forth herein.

Processor 902 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in an application specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

I claim:

1. A method comprising:
    starting a survivor process associated with a storage cluster application;
    detecting a crash of the storage cluster application; and
    performing a smooth restart of the storage cluster application after the crash according to a new storage cluster application configured to replace the storage cluster application by managing open handles associated with the storage cluster application,
    wherein performing a smooth restart of the storage cluster application after the crash comprises:
        recovering context data associated with the storage cluster application;
        determining consistency of the recovered context data;
        recovering open handles associated with the storage cluster application from the associated survivor process; and
        replaying any commands that were not complete, based upon the recovered open handles when the crash was detected to the storage cluster application.

2. The method of claim 1, further comprising:
    setting an in progress attribute at times an associated command is started by the storage cluster application; and
    clearing the in progress attribute at times the associated command is completed by the storage cluster application;
    wherein replaying any commands that were not complete when the crash was detected to the storage cluster application comprises:
        determining whether the in progress attribute is set for any commands; and
        replaying any commands for which the in progress attribute is set.

3. The method of claim 1, further comprising:
    identifying one or more critical portions of commands processed by the storage cluster application;
    upon reaching a critical portion of a command, incrementing a critical portion counter; and
    upon completing a critical portion of a command, decrementing the critical portion counter;
    wherein determining consistency of the recovered context data comprises determining that the recovered context data is consistent when the critical portion counter is equal to an expected value.

4. The method of claim 1, further comprising:
    opening one or more handles associated with a connection between a client and an associated storage cluster application;
    incrementing a reference counter associated with the one or more open handles;
    updating context data associated with the one or more open handles associated with the storage cluster application; and
    passing the one or more open handles to the survivor process associated with the storage cluster application.

5. The method of claim 4, further comprising incrementing the reference counter associated with the one or more open handles passed to the survivor process.

6. The method of claim 5, further comprising decrementing the reference counter associated with the one or more open handles if a storage cluster application is stopped.

7. The method of claim 6, further comprising:
    closing, at times the reference counter associated with one of the one or more open handles is equal to zero, a corresponding handle;
    removing context data associated with the closed handle; and
    removing the closed handle from the survivor process associated with the storage cluster application.

8. A system comprising:
    a processor; and
    memory storing computer program code that when executed on the processor causes the processor to execute commands of a storage system operable to perform the operations of:
        starting a survivor process associated with a storage cluster application;
        detecting a crash of the storage cluster application; and
        performing a smooth restart of the storage cluster application after the crash according to a new storage cluster application configured to replace the storage cluster application by managing open handles associated with the storage cluster application,
    wherein performing a smooth restart of the storage cluster application after the crash comprises:
        recovering context data associated with the storage cluster application;
        determining consistency of the recovered context data;
        recovering open handles associated with the storage cluster application from the associated survivor process; and
        replaying any commands that were not complete, based upon the recovered open handles, when the crash was detected to the storage cluster application.

9. The system of claim 8, wherein the system is further operable to perform the operations of:
    setting an in progress attribute at times an associated command is started by the storage cluster application; and
    clearing the in progress attribute at times the associated command is completed by the storage cluster application;
    wherein replaying any commands that were not complete when the crash was detected to the storage cluster application comprises:
        determining whether the in progress attribute is set for any commands; and
        replaying any commands for which the in progress attribute is set.

10. The system of claim 8, wherein the system is further operable to perform the operations of:
    identifying one or more critical portions of commands processed by the storage cluster application;
    upon reaching a critical portion of a command, incrementing a critical portion counter; and
    upon completing a critical portion of a command, decrementing the critical portion counter;
    wherein determining consistency of the recovered context data comprises determining that the recovered context data is consistent when the critical portion counter is equal to an expected value.

11. The system of claim 8, wherein the system is further operable to perform the operations of:
    opening one or more handles associated with a connection between a client and an associated storage cluster application;
    incrementing a reference counter associated with the one or more open handles;
    updating context data associated with the one or more open handles associated with the storage cluster application; and passing the one or more open handles to the survivor process associated with the storage cluster application.

12. The system of claim 11, wherein the system is further operable to perform the operations of:
    incrementing a reference counter associated with the one or more open handles passed to the survivor process; and
    decrementing the reference counter associated with the one or more open handles if a storage cluster application is stopped.

13. The system of claim 12, wherein the system is further operable to perform the operations of:
    closing, at times the reference counter associated with one of the one or more open handles is equal to zero, a corresponding handle;
    removing context data associated with the closed handle; and
    removing the closed handle from the survivor process associated with the storage cluster application.

14. A computer program product including a non-transitory computer readable storage medium having computer program code encoded thereon that when executed on a processor of a computer causes the computer to execute commands of a storage system, the computer program product comprising:
    computer program code for starting a survivor process associated with a storage cluster application;
    computer program code for detecting a crash of the storage cluster application; and
    computer program code for performing a smooth restart of the storage cluster application after the crash according to a new storage cluster application configured to replace the storage cluster application by managing open handles associated with the storage cluster application,
    wherein performing a smooth restart of the storage cluster application after the crash comprises:
        recovering context data associated with the storage cluster application;
        determining consistency of the recovered context data;
        recovering open handles associated with the storage cluster application from the associated survivor process; and
    replaying any commands that were not complete based upon the recovered open handles when the crash was detected to the storage cluster application.

15. The computer program product of claim 14, further comprising:
    computer program code for setting an in progress attribute at times an associated command is started by the storage cluster application; and
    computer program code for clearing the in progress attribute at times the associated command is completed by the storage cluster application;
    wherein replaying any commands that were not complete at times the crash was detected to the storage cluster application comprises:
        determining whether the in progress attribute is set for any commands; and
        replaying any commands for which the in progress attribute is set.

16. The computer program product of claim 15, wherein the storage cluster application is further operable to perform the operations of:
    computer program code for identifying one or more critical portions of commands processed by the storage cluster application;
    computer program code for incrementing, upon reaching a critical portion of a command, a critical portion counter; and
    computer program code for decrementing, upon completing a critical portion of a command, the critical portion counter;
    wherein determining consistency of the recovered context data comprises determining that the recovered context data is consistent when the critical portion counter is equal to an expected value.

17. The computer program product of claim 16, further comprising:
    computer program code for opening one or more handles associated with a connection between a client and an associated storage cluster application;
    computer program code for incrementing a reference counter associated with the one or more open handles;
    computer program code for updating context data associated with the one or more open handles associated with the storage cluster application;
    computer program code for passing the one or more open handles to the survivor process associated with the storage cluster application;
    computer program code for incrementing a reference counter associated with the one or more open handles passed to the survivor process;
    computer program code for decrementing the reference counter associated with the one or more open handles if a storage cluster application is stopped;
    computer program code for closing, at times the reference counter associated with one of the one or more open handles is equal to zero, a corresponding handle;
    computer program code for removing context data associated with the closed handle; and
    computer program code for removing the closed handle from the survivor process associated with the storage cluster application.

* * * * *